(12) United States Patent
Lee et al.

(10) Patent No.: US 11,946,948 B2
(45) Date of Patent: Apr. 2, 2024

(54) ROAD CONDITION DETECTING METHOD AND AUTOMOTIVE SYSTEM PROVIDING THE SAME

(71) Applicants: Hyundai Motor Company, Seoul (KR); Kia Corporation, Seoul (KR)

(72) Inventors: Minwoo Lee, Whasung-Si (KR); Kyowoong Choo, Whasung-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 323 days.

(21) Appl. No.: 17/569,858

(22) Filed: Jan. 6, 2022

(65) Prior Publication Data
US 2022/0326274 A1    Oct. 13, 2022

(30) Foreign Application Priority Data
Apr. 13, 2021   (KR) .................. 10-2021-0047530

(51) Int. Cl.
*G01P 15/00*    (2006.01)
*B60W 40/072*    (2012.01)
(Continued)

(52) U.S. Cl.
CPC .......... *G01P 15/00* (2013.01); *B60W 40/072* (2013.01); *B60W 40/10* (2013.01);
(Continued)

(58) Field of Classification Search
CPC ...... G01P 15/00; G01P 15/0891; G01P 15/18; B60W 40/072; B60W 40/10;
(Continued)

(56) References Cited

U.S. PATENT DOCUMENTS 7,587,267 B2 *  9/2009  Mori .................. B60W 10/184
                                                701/93
2004/0167705 A1 * 8/2004 Lingman ............... B60T 8/172
                                                701/124
(Continued)

FOREIGN PATENT DOCUMENTS

KR     2020005765 A  *  1/2020  ............. G01S 19/14

*Primary Examiner* — Adnan Aziz
(74) *Attorney, Agent, or Firm* — MORGAN, LEWIS & BOCKIUS LLP

(57) ABSTRACT

An automotive system providing method for detecting a road in an abnormal state based on a measured value of an acceleration sensor mounted on a vehicle includes an acceleration sensor measuring a value of gravity acceleration acting on a vehicle; a position measuring sensor measuring a position of the vehicle; a memory in which the measured value of the gravity acceleration and the position of the vehicle at a time point at which the gravity acceleration is measured are stored; and a controller electrically connected to the acceleration sensor, the position measuring sensor and the memory and configured for determining a road corresponding to the position where the value of the gravity acceleration is measured as being in an abnormal condition when the controller concludes that a difference value between the value of the gravity acceleration measured during operation of the vehicle and a reference acceleration value added to the value of the gravity acceleration to correct the value of the gravity acceleration as a zero reference point is out of a predetermined threshold range.

16 Claims, 4 Drawing Sheets

(51) Int. Cl.
*B60W 40/10* (2012.01)
*B60W 50/02* (2012.01)
*G01S 19/01* (2010.01)
*G08C 17/02* (2006.01)

(52) U.S. Cl.
CPC ......... *B60W 50/0205* (2013.01); *G01S 19/01* (2013.01); *G08C 17/02* (2013.01); *B60W 2520/00* (2013.01); *B60W 2552/15* (2020.02); *B60W 2552/35* (2020.02)

(58) Field of Classification Search
CPC ......... B60W 50/0205; B60W 2520/00; B60W 2552/15; B60W 2552/35; B60W 40/06; B60W 2556/45; B60W 30/18054; B60W 40/107; B60W 2050/0002; B60W 2520/10; B60W 2520/105; B60Y 2300/1805; B60Y 2400/304; G01S 19/01; G08C 17/02; G01D 21/02
USPC .......................................... 701/80, 124, 442
See application file for complete search history.

(56) References Cited

U.S. PATENT DOCUMENTS

| | | | |
|---|---|---|---|
| 2009/0082952 A1* | 3/2009 | Narita | G01C 21/3469 701/533 |
| 2013/0238164 A1* | 9/2013 | Matsuda | B60W 40/076 701/1 |
| 2014/0309803 A1* | 10/2014 | You | B60W 40/076 701/1 |
| 2015/0051785 A1* | 2/2015 | Pal | G01P 15/18 701/29.1 |
| 2015/0291176 A1* | 10/2015 | Jeong | B60W 40/076 701/408 |
| 2016/0082974 A1* | 3/2016 | Jeong | G01C 9/08 702/154 |
| 2017/0015329 A1* | 1/2017 | Furukawa | B60W 40/06 |
| 2022/0144160 A1* | 5/2022 | Kang | B60Q 1/115 |
| 2022/0266836 A1* | 8/2022 | Segawa | B60W 40/06 |
| 2023/0041499 A1* | 2/2023 | Uestuenel | B60W 40/072 |

* cited by examiner

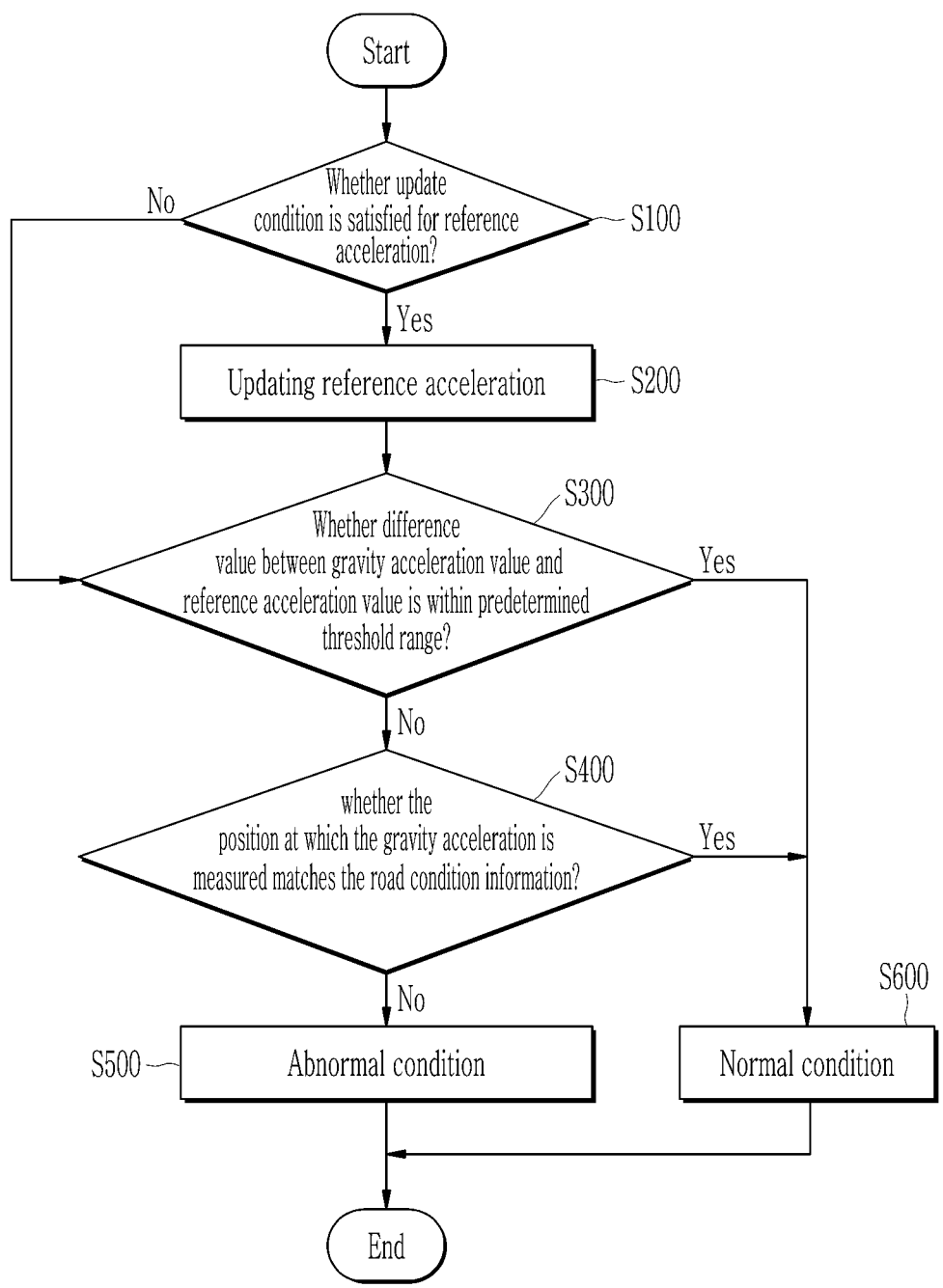

ROAD CONDITION DETECTING METHOD AND AUTOMOTIVE SYSTEM PROVIDING THE SAME

CROSS-REFERENCE TO RELATED APPLICATION

The present application claims priority to Korean Patent Application No. 10-2021-0047530 filed on Apr. 13, 2021, the entire contents of which is incorporated herein for all purposes by this reference.

BACKGROUND OF THE INVENTION

Field of the Invention

The present invention relates to a method for detecting a road in an abnormal state (e.g., damage, etc.) based on a measured value of an acceleration sensor mounted on a vehicle, and an automotive system providing the method.

Description of Related Art

Serious loss of life and property are occurring due to abnormal conditions of roads such as potholes. To prevent this, a road management center (e.g., the Korea Highway Corporation, a road maintenance department of local governments, etc.) periodically checks the road conditions and removes the risk by repairing the road which is in an abnormal state or by urgently restoring the road surface.

However, such a response not only does not reflect the real-time road conditions immediately, but also wastes a lot of manpower and material costs to detect the abnormal conditions of the road, and it is difficult to check national road conditions in a short time period.

Accordingly, recently, research and development on checking road conditions in real time using a vehicle traveling on the road is in progress. However, a technology that can detect the road conditions with high reliability has not yet been developed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a road condition detection method for detecting an abnormal condition of a road using a value of the gravity acceleration measured by an acceleration sensor, and an automotive system providing the method.

An automotive system according to various exemplary embodiments of the present invention may include an acceleration sensor configured for measuring a value of gravity acceleration acting on a vehicle; a position measuring sensor configured for measuring a position of the vehicle; a memory in which the measured value of the gravity acceleration and the position of the vehicle at a time point at which the gravity acceleration is measured are stored; and a controller electrically connected to the acceleration sensor, the position measuring sensor and the memory and configured for determining a road corresponding to the position where the value of the gravity acceleration is measured as being in an abnormal condition when the controller concludes that a difference value between the value of the gravity acceleration measured during operation of the vehicle and a reference acceleration value added to the value of the gravity acceleration to correct the value of the gravity acceleration as a zero reference point is out of a predetermined threshold range, wherein the controller is configured to update the reference acceleration value by adjusting a magnitude of the value of the gravity acceleration measured while the vehicle is stopped as the reference acceleration value when the vehicle satisfies a first update condition in which the vehicle is stopped for more than a predetermined reference time and a second update condition in which a slope of the road on which the vehicle is stopped is equal to or less than a predetermined reference slope.

The memory may further store road condition information including at least one of information among road slopes, curved sections, unpaved sections, manholes, road protrusions and depressions, and speed bumps, and the controller may be configured to determine the road corresponding to the position as being in the abnormal condition when the difference value is out of the predetermined threshold range and the position at which the value of the gravity acceleration is measured does not match the road condition information, and may determine the road corresponding to the position as a normal condition when, even if the difference value is out of the predetermined threshold range, the position at which the value of the gravity acceleration is measured matches the road condition information.

The controller may be configured to determine that the difference value is out of the predetermined threshold range when the difference value is less than a minimum value of the predetermined threshold range, or greater than a maximum value of the predetermined threshold range.

The automotive system may further include a communication unit of wireless communication with the server, and the controller may transmit the value of the gravity acceleration measured for a predetermined time period before and after the time point to the server through the communication unit, including a time point at which the value of the gravity acceleration, which is a determining reference of the abnormal condition, was measured.

The controller may transmit additional information including at least one of the vehicle's position, the vehicle's speed, and the road condition information to the server through the communication unit of the predetermined time period.

A method of detecting road condition according to various exemplary embodiments of the present invention includes: determining whether a vehicle satisfies a first update condition in which the vehicle is stopped for more than a predetermined reference time and a second update condition in which a slope of the road on which the vehicle is stopped is equal to or less than a predetermined reference slope; updating the reference acceleration value by adjusting a magnitude of the value of the gravity acceleration measured while the vehicle is stopped as a reference acceleration value when the controller concludes that the first update condition and the second update condition are satisfied as a result of the determining; determining whether the difference value between the value of the gravity acceleration measured during operation of the vehicle and the reference acceleration value is included within a predetermined threshold range; and determining the road corresponding to the position at which the value of the gravity acceleration is measured as being in an abnormal condition when the controller concludes that the difference value is out of the predetermined threshold range as a result of the determining, wherein the reference acceleration value is a compensation value added to the value of the gravity acceleration to correct the value of the gravity acceleration measured during the operation of the vehicle based on a zero reference point.

The method may further include, after determining whether the difference value belongs to the predetermined threshold range, determining whether the position at which the value of the gravity acceleration is measured matches the road condition information when the controller concludes that the difference value is out of the predetermined threshold range as the result of the determining, in the determining of the road as being in the abnormal condition, if the position at which the value of the gravity acceleration is measured does not match the road condition information as a result of the determining, the road corresponding to the position at which the value of the gravity acceleration is measured may be determined as being in an abnormal condition, and the road condition information may include at least one of information among road slopes, curved sections, unpaved sections, manholes, road protrusions and depressions, and speed bumps.

The method may further include determining the road corresponding to the position where the value of the gravity acceleration is measured as a normal condition when the controller concludes that the position where the value of the gravity acceleration is measured matches the road condition information as a determining result. In the determining whether the difference value belongs to the predetermined threshold range, if the difference value is less than a minimum value of the predetermined threshold range, or greater than a maximum value of the predetermined threshold range, it may be determined that the difference value is out of the predetermined threshold range.

In the determining of the road as being in an abnormal condition, the measured value of the gravity acceleration for a predetermined time period before and after the time point may be transmitted to the server, including the time point at which the value of the gravity acceleration, which is a determining reference of the abnormal condition, was measured.

In the determining of the road as being in an abnormal condition, additional information including at least one of the vehicle's position, the vehicle's speed, and the road condition information may be transmitted to the server for the predetermined time period.

The present invention, by updating the reference acceleration value that corrects the value of the gravity acceleration measured during operation of the vehicle based on the zero point, whenever a predetermined update condition is satisfied, may detect the road condition with high reliability.

The present invention, by detecting a damaged or slippery road while driving a vehicle on the road, may save manpower or resources to detect road conditions.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a flowchart for explaining a method of detecting road condition according to various exemplary embodiments of the present invention.

Figure 1:
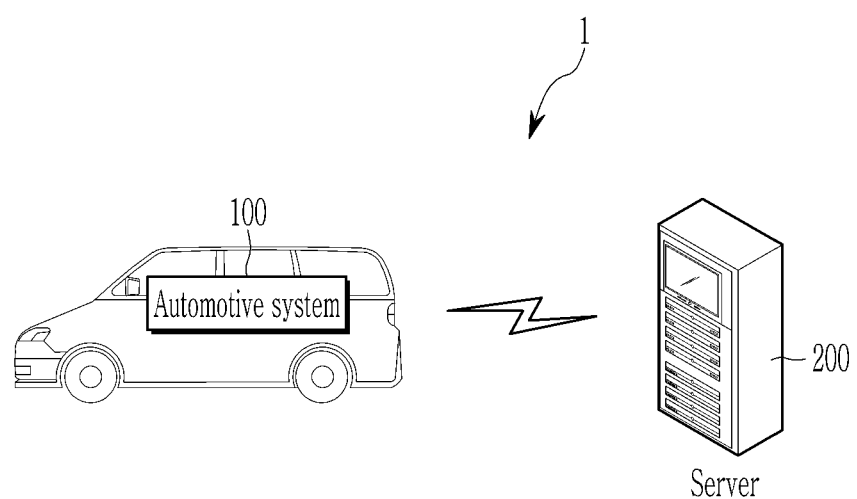
FIG. 1 is a schematic view for explaining a road management system providing a method of detecting road condition according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, embodiments included in the exemplary embodiment will be described in detail with reference to the accompanying drawings. In the exemplary embodiment, the same or similar constituent elements will be denoted by the same or similar reference numerals, and an overlapped description thereof will be omitted. The terms "module" and "unit" for components used in the following description are used only to easily write the specification. Therefore, these terms do not have meanings or roles that distinguish them from each other in and of themselves. Furthermore, in describing exemplary embodiments of the exemplary embodiment, when it is determined that a detailed description of the well-known art associated with the present invention may obscure the gist of the present invention, it will be omitted. Furthermore, the accompanying drawings are provided only to allow exemplary embodiments included in the exemplary embodiment to be easily understood and are not to be interpreted as limiting the spirit included in the exemplary embodiment, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be directly connected or coupled to another component or may be connected or coupled to another component with the other component intervening therebetween. On the other hand, it is to be understood that when one component is referred to as being "connected or coupled directly" to another component, it may be connected to or coupled to another component without another component intervening therebetween.

It will be further understood that term "comprise" or "have" used in the exemplary embodiment specifies the presence of stated features, numerals, steps, operations, components, parts, or a combination thereof, but does not preclude the presence or addition of one or more other features, numerals, steps, operations, components, parts, or a combination thereof.

FIG. 1 is a schematic view for explaining a road management system providing a method of detecting road condition according to various exemplary embodiments of the present invention.

Figure 2:
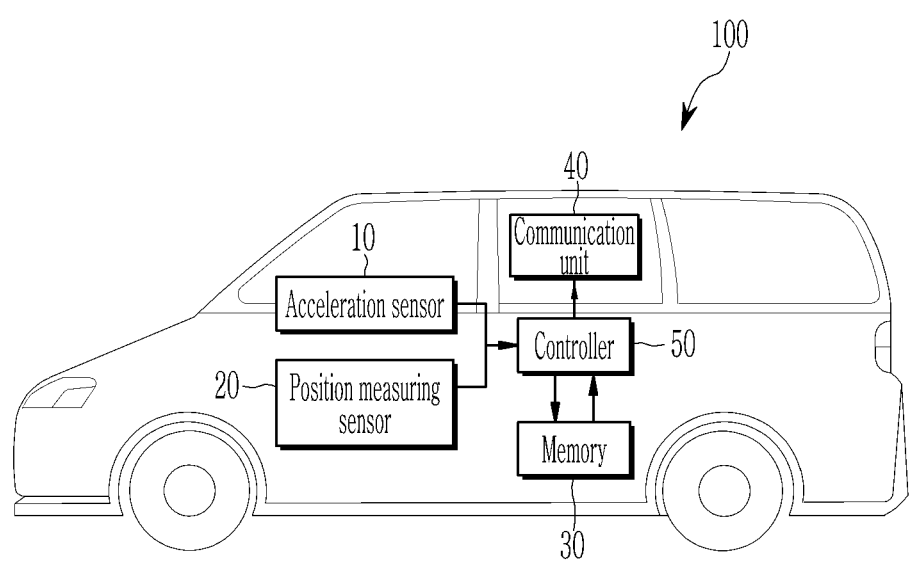
FIG. 2 is a block diagram for explaining a configuration of an automotive system of FIG. 1 in detail.

FIG. 2 is a block diagram for explaining a configuration of an automotive system of FIG. 1 in detail.

Figure 3:
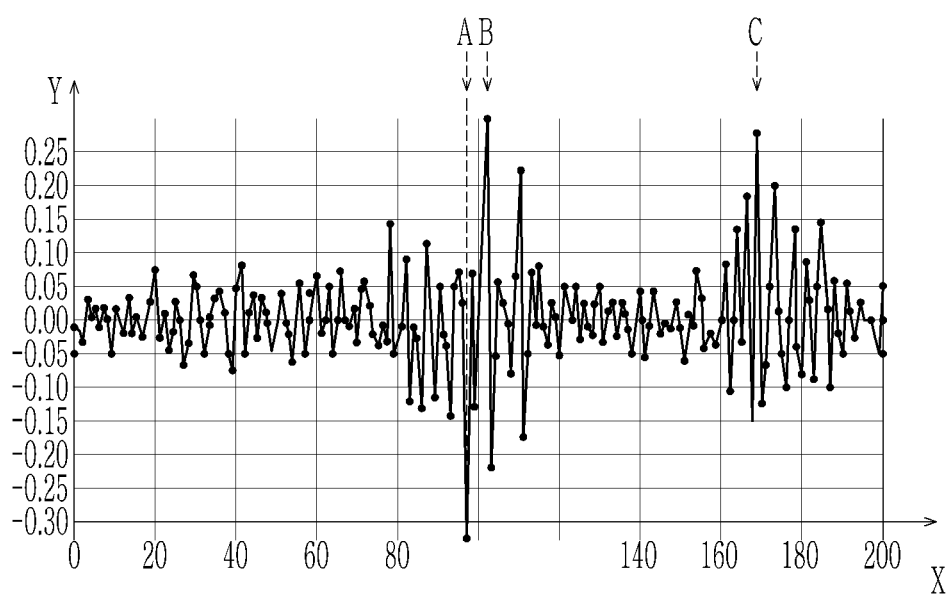
FIG. 3 is an exemplary diagram displaying a difference value between a value of the gravity acceleration measured during an operation of a vehicle and a reference acceleration value in a predetermined section according to various exemplary embodiments of the present invention.

FIG. 3 is an exemplary diagram displaying a difference value between a value of the gravity acceleration measured during an operation of a vehicle and a reference acceleration value in a predetermined section according to various exemplary embodiments of the present invention.

Referring to FIG. 1, a road management system 1 includes an automotive system 100 and a server 200.

The automotive system 100 is mounted on the vehicle, measures the value of the gravity acceleration while the vehicle is running and stopped, and determines the normal or abnormal condition of the road based on the measured gravity acceleration. If the road is in an abnormal condition as the determining result, the automotive system 100 sends the value of the gravity acceleration measured for a predetermined time interval before and after the time point, including a time point at which the value of the gravity acceleration, which is a determining reference of the abnormal condition, was measured, and additional information to the server 200.

The additional information may include the position on the road of the vehicle that has moved, the speed of the vehicle, and the road condition information. In the instant case, the road condition information may include information related to a road slope, a curved section, an unpaved section, a manhole, road protrusions and depressions, and a speed bump.

The server 200 may update the existing road condition information by analyzing or processing the information on the road in the abnormal condition received from a plurality of vehicles. For example, the server 200 may transmit a warning message including information such as the road damage to the vehicle operating near the road is in the abnormal condition. For another example, the server 200 may transmit the updated road condition information to the road management center (e.g., the Korea Road Corporation, a local government road maintenance department, etc.).

Referring to FIG. 2, the automotive system 100 includes an acceleration sensor 10, a position measuring sensor 20, a memory 30, a communication unit 40, and a controller 50.

The acceleration sensor 10 measures the value of the gravity acceleration acting on the vehicle and transmits the measured value of the gravity acceleration to the controller 50. The acceleration sensor 10 may measure the magnitude by dividing the value of the gravity acceleration acting on the vehicle into an X-axis vector, a Y-axis vector, and a Z-axis vector.

The acceleration sensor 10 may determine the value of the gravity acceleration by summing the X-axis vector, the Y-axis vector, and the Z-axis vector. For example, the acceleration sensor 10 may include an acceleration sensor mounted in an Audio Video Navigation Telematics (AVNT) system, but it is not limited thereto, and may include all sensors measuring the value of the gravity acceleration acting on the vehicle regardless of the mounted position thereof.

The position measuring sensor 20 measures the position of the vehicle and transmits the measured position to the controller 50. For example, the position measuring sensor 20 may include a sensor for measuring the position of the vehicle with a Global Positioning System (GPS), but it is not limited thereto, and may include various methods for measuring the position of the vehicle.

The memory 30 may store a value of the gravity acceleration measured by the acceleration sensor 10, a position of the vehicle measured by the position measuring sensor 20, the speed of the vehicle, the road condition information, the reference acceleration, and the like. For example, the memory 30 may be stored by mapping the value of the gravity acceleration and the vehicle position measured at a predetermined time point.

The communication unit 40 may transmit and receive data by performing wireless communication with the server 200. For example, the communication unit 40 may transmit the value of the gravity acceleration and the additional information to the server 200 by control of the controller 50.

The controller 50 may determine a normal condition or an abnormal condition of the road based on the value of the gravity acceleration measured by the acceleration sensor 10.

According to various exemplary embodiments of the present invention, the controller 50 may determine that the road corresponding to the position at which the value of the gravity acceleration is measured is in an abnormal condition when the difference value between the measured value of the gravity acceleration and the reference acceleration value deviates from a predetermined threshold range during the vehicle operation.

Referring to FIG. 3, the difference value Y at the first point A is less than the lower limit value (e.g., −0.25) of the predetermined threshold range. At the second point B and the third point C, the difference value Y is greater than the upper limit of the predetermined threshold range (e.g., 0.25). The controller 50 may determine the road corresponding to the first point A, the second point B, and the third point C as being in an abnormal condition.

According to another exemplary embodiment of the present invention, when the difference value Y of the value of the gravity acceleration measured during operation of the vehicle and the reference acceleration value deviates from a predetermined threshold range, and simultaneously the position corresponding to the difference value Y is not matched to the road condition information, the controller 50 may determine the road corresponding to the position where the value of the gravity acceleration is measured as being in an abnormal condition.

Referring to FIG. 3, it is assumed that the difference values Y of the first point A, the second point B, and the third point C are out of the predetermined threshold range, and at the present time, it is assumed that the third point C matches the road condition information (e.g., the presence of the speed bumps), but each of the first point A and the second point B does not match the road condition information (e.g., the manholes, the road protrusions and depressions, the speed bumps, etc.). Accordingly, the controller 50 may determine the road corresponding to the first point A and the second point B in which the difference value Y is out of the predetermined threshold range and does not simultaneously match the road condition information as being in an abnormal condition. That is, when it is based on the value of the gravity acceleration, even if any road is determined to be in an abnormal condition, if the position of the road matches the pre-stored road condition information, the controller 50 does not determine the corresponding position as being in an abnormal condition. Therefore, the controller 50 may transmit only information related to the newly generated road damage or slip area to the server 200.

FIG. 4 is a flowchart for explaining a method of detecting road condition according to various exemplary embodiments of the present invention.

Hereinafter, the road condition detecting method and the automotive system providing the method are described with reference to FIG. 1, FIG. 2, FIG. 3, and FIG. 4.

Referring to FIG. 4, the controller 50 determines whether a first update condition in which the vehicle is stopped for more than a predetermined reference time and a second update condition in which the slope of the road on which the vehicle is stopped is less than or equal to a predetermined reference slope are satisfied (S100). For example, the first update condition may be set such that the vehicle is stopped for 5 seconds or longer, and the second update condition may be set such that the slope of the road on which the vehicle is stopped is 12° or more.

Next, if the first update condition and second update condition are satisfied (S100, Yes) as the determining result, the controller 50 updates the reference acceleration value by adopting the magnitude of the value of the gravity acceleration measured while the vehicle is stopped as the reference acceleration value (S200).

The reference acceleration value may be a compensation value added to the value of the gravity acceleration to correct the measured value of the gravity acceleration while the vehicle is running as a zero reference point. For example, if the value of the gravity acceleration is −9.2 g and the reference acceleration value is 9.6 g, the corrected value of the gravity acceleration may be positioned above the zero point (+0.4 g) on the graph. For another example, if the value of the gravity acceleration is −9.8 g and the reference acceleration value is 9.6 g, the corrected value of the gravity acceleration may be positioned below the zero point (−0.2 g) on the graph. That is, the reference acceleration value may be a compensation value which may easily check how much the value of the gravity acceleration measured while the vehicle is running fluctuates up and down from the zero point.

For example, it is assumed that the previous reference acceleration value was 9.6 g, and the measured value of the gravity acceleration while satisfying the first update condition and the second update condition is −9.8 g, then, the controller 50 may update the reference acceleration value by adopting 9.8 g, which is the magnitude of the value of the gravity acceleration measured while satisfying the first update condition and the second update condition, as the reference acceleration value. In the instant case, the reference acceleration value may be updated from 9.6 g to 9.8 g. According to various exemplary embodiments of the present invention, the controller 50 may update the reference acceleration value whenever the first update condition and the second update condition are satisfied, minimizing the occurrence of an error when correcting the actually measured value of the gravity acceleration based on the zero point.

Next, as the determining result, if the first update condition and the second update condition are not satisfied (S100, No) or the reference acceleration value is updated (S200), the controller 50 determines whether the difference value between the value of the gravity acceleration measured during vehicle operation and the reference acceleration value is included within a predetermined threshold range (S300).

If the reference acceleration value is not updated, the controller 50 determines the difference value between the previous reference acceleration value and the value of the gravity acceleration. When the reference acceleration value is updated, the controller 50 determines the difference value between the updated reference acceleration value and the value of the gravity acceleration. According to various exemplary embodiments of the present invention, when the difference value is less than the minimum value of the predetermined threshold range or greater than the maximum value of the predetermined threshold range, the controller 50 may determine that the difference value is out of the predetermined threshold range.

Referring to FIG. 3, when the minimum value of the predetermined threshold range is set to −0.25 and the maximum value is set to 0.25, the predetermined threshold range may be expressed as '−0.25≤the difference value Y≤0.25'. The first point A has the difference value Y of less than the minimum value −0.25, and the second point B and the third point C have the difference value Y of greater than the maximum value 0.25. That is, the controller 50 may determine that the difference value (Y) of each of the first point A, the second point B, and the third point C is out of a predetermined threshold range.

Next, when a determining result difference value is out of a predetermined threshold range (S300, No), the controller 50 determines whether the position at which the value of the gravity acceleration is measured matches the road condition information (S400). In the instant case, the road condition information may include information related to a road slope, a curved section, an unpaved section, a manhole, road protrusions and depressions, and a speed bump.

Next, if the determining result does not match (S400, No), the controller 50 determines the road corresponding to the position where the value of the gravity acceleration is measured as being an abnormal condition (S500).

For example, if the difference value is out of the predetermined threshold range even though there are no previously confirmed manholes or speed bumps at the position where the value of the gravity acceleration is measured, the controller 50 may determine that the road at the corresponding position is in an abnormal condition. In summary, when a change in the value of the gravity acceleration that does not match the previously confirmed road condition is detected, the controller 50 may determine the road corresponding to the position as an abnormal condition.

According to various exemplary embodiments of the present invention, the controller 50 may transmit the measured value of the gravity acceleration and additional information to the server 200 for a predetermined time period before and after the time point, including the time point at which the value of the gravity acceleration, which is the reference for determining the abnormal condition, is measured.

Next, if the difference value is included within the predetermined threshold range (S300, Yes) as the determining result or the matching generated (S400, Yes) as the determining result, the controller 50 determines the road corresponding to the position where the value of the gravity acceleration is measured as a normal condition (S600).

For example, if there is a speed bump at the position where the value of the gravity acceleration is measured, the controller 50 determines that the difference value is out of the predetermined threshold range by the value of the gravity acceleration measured while the vehicle passes the speed bump. That is, the controller 50 may determine the road of the corresponding position as a normal condition even if the difference value is out of the predetermined threshold range for the road conditions such as the manholes and the speed bumps that have been previously confirmed.

Referring to FIG. 3, it is assumed that the difference values Y of the first point A, the second point B, and the third point C are out of a predetermined threshold range, and the third point C is matched with the road condition information (e.g., the presence of a speed bump), but each of the first point A and the second point B does not match the road condition information (e.g., the manholes, the road protrusions and depressions, the speed bumps, etc.).

Accordingly, the controller 50 may determine the road corresponding to the first point A and the second point B in which the difference value Y is out of the predetermined threshold range and is not simultaneously matched with the road condition information as being in an abnormal condition. That is, if it is based on the value of the gravity acceleration, even if any road is determined to be in an abnormal condition, if the position of the road is matched with the pre-stored road condition information, the controller 50 does not determine the corresponding position as being in an abnormal condition. Therefore, the controller 50 may transmit only information related to the newly generated road damage or slip area to the server 200.

According to various exemplary embodiments of the present invention, referring to FIG. 3, the controller 50 may transmit the value of the gravity acceleration measured for a predetermined time period before and after that time point, including the time point (the first point A and the second point B) at which the value of the gravity acceleration, which is the determining reference of the abnormal condition, was measured, and the additional information to the server 200.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An automotive system comprising:
   an acceleration sensor configured for measuring a value of gravity acceleration acting on a vehicle;
   a position measuring sensor configured for measuring a position of the vehicle,
   a memory in which the measured value of the gravity acceleration and the position of the vehicle at a time point at which the gravity acceleration is measured are stored; and
   a controller electrically connected to the acceleration sensor, the position measuring sensor and the memory and configured for determining a road corresponding to the position where the value of the gravity acceleration is measured as being in an abnormal condition when the controller concludes that a difference value between the value of the gravity acceleration measured during operation of the vehicle and a reference acceleration value added as a compensation value to the value of the gravity acceleration to correct the value of the gravity acceleration as a zero reference point is out of a predetermined threshold range, wherein the controller is configured to update the reference acceleration value by adjusting a magnitude of the value of the gravity acceleration measured while the vehicle is stopped as the reference acceleration value when the vehicle satisfies a first update condition in which the vehicle is stopped for more than a predetermined reference time and a second update condition in which a slope of the road on which the vehicle is stopped is equal to or less than a predetermined reference slope.

2. The automotive system of claim 1, wherein the controller is configured to determine the road corresponding to the position as being in the abnormal condition when the difference value is out of the predetermined threshold range and the position at which the value of the gravity acceleration is measured does not match road condition information, and wherein the controller is configured to determine the road corresponding to the position as a normal condition when, even if the difference value is out of the predetermined threshold range, the position at which the value of the gravity acceleration is measured matches the road condition information.

3. The automotive system of claim 2, wherein the memory is further configured to store the road condition information including at least one of information among road slopes, curved sections, unpaved sections, manholes, road protrusions and depressions, and speed bumps.

4. The automotive system of claim 1, wherein the controller is configured to determine that the difference value is out of the predetermined threshold range when the difference value is less than a minimum value of the predetermined threshold range, or greater than a maximum value of the predetermined threshold range.

5. The automotive system of claim 2, further including:

a communication unit configured for wireless communication with a server, and the controller is configured to transmit the value of the gravity acceleration measured for a predetermined time period before and after the time point to the server through the communication unit, including a time point at which the value of the gravity acceleration, which is a determining reference of the abnormal condition, was measured.

6. The automotive system of claim 5, wherein the controller is configured to transmit additional information including at least one of the vehicle's position, the vehicle's speed, and the road condition information to the server through the communication unit for the predetermined time period.

7. A method of detecting road condition, the method comprising:

determining, by a controller, whether a vehicle satisfies a first update condition in which the vehicle is stopped for more than a predetermined reference time and a second update condition in which a slope of a road on which the vehicle is stopped is equal to or less than a predetermined reference slope;

updating, by the controller, a reference acceleration value by adjusting a magnitude of a value of gravity acceleration measured while the vehicle is stopped as a reference acceleration value when the controller concludes that the first update condition and the second update condition are satisfied as a result of the determining;

determining, by the controller, whether a difference value between the value of the gravity acceleration measured during operation of the vehicle and the reference acceleration value is within a predetermined threshold range; and determining, by the controller, the road corresponding to a position at which the value of the gravity acceleration is measured as being in an abnormal condition when the controller concludes that the difference value is out of the predetermined threshold range as a result of the determining, wherein the reference acceleration value is a compensation value added to the value of the gravity acceleration to correct the value of the gravity acceleration measured during the operation of the vehicle based on a zero reference point.

8. The method of claim 7, further including:

after determining whether the difference value belongs to the predetermined threshold range, determining, by the controller, whether the position at which the value of the gravity acceleration is measured matches road condition information when the controller concludes that the difference value is out of the predetermined threshold range as the result of the determining, in the determining of the road as being in the abnormal condition, when the controller concludes that the position at which the value of the gravity acceleration is measured does not match the road condition information as the result of the determining, determining, by the controller, the road corresponding to the position at which the value of the gravity acceleration is measured as being in the abnormal condition, wherein the road condition information includes at least one of information among road slopes, curved sections, unpaved sections, manholes, road protrusions and depressions, and speed bumps.

9. The method of claim 8, further including:

determining, by the controller, the road corresponding to the position where the value of the gravity acceleration is measured as a normal condition when the controller concludes that the position where the value of the gravity acceleration is measured matches the road condition information as the result of the determining.

10. The method of claim 7, wherein in the determining whether the difference value belongs to the predetermined threshold range, when the controller concludes that the difference value is less than a minimum value of the predetermined threshold range, or greater than a maximum value of the predetermined threshold range, the controller is configured to conclude that the difference value is out of the predetermined threshold range.

11. The method of claim 8, further including:

transmitting, by the controller, the value of the gravity acceleration measured for a predetermined time period before and after a time point to a server, including a time point at which the value of the gravity acceleration, which is a determining reference of the abnormal condition, was measured.

12. The method of claim 11, wherein the controller is configured to transmit the value of the gravity acceleration measured for the predetermined time period before and after the time point to the server via a communication unit configured for wireless communication with the server.

13. The method of claim 11, further including:
in the determining of the road as being in the abnormal condition,
transmitting, by the controller, additional information including at least one of the vehicle's position, the vehicle's speed, and the road condition information to the server for the predetermined time period.

14. The method of claim 13, further including:
in the determining of the road as being in the abnormal condition, when the server receives the road condition information, the server is configured to transmit a warning message including the road condition information to a vehicle operating near the road in the abnormal condition or a road management center.

15. A non-transitory computer readable storage medium on which a program for performing the method of claim 7 is recorded.

16. A load management system comprising:
the automotive system of claim 6; and
the server,
wherein the server is configured to transmit a warning message including the road condition information to a vehicle operating near the road in the abnormal condition or a road management center.

* * * * *